(12) United States Patent
Hori et al.

(10) Patent No.: US 11,055,481 B2
(45) Date of Patent: Jul. 6, 2021

(54) INFORMATION INPUT METHOD, INFORMATION INPUT APPARATUS, AND INFORMATION INPUT SYSTEM

(71) Applicant: SPALO Co., Ltd., Tokyo (JP)

(72) Inventors: Koichi Hori, Tokyo (JP); Daisuke Koichi, Tokyo (JP)

(73) Assignee: SPALO Co., Ltd., Tokyo (JP)

( * ) Notice: Subject to any disclaimer, the term of this patent is extended or adjusted under 35 U.S.C. 154(b) by 0 days.

(21) Appl. No.: 16/104,134

(22) Filed: Aug. 16, 2018

(65) Prior Publication Data

US 2019/0005014 A1 Jan. 3, 2019

Related U.S. Application Data

(63) Continuation of application No. PCT/JP2018/024614, filed on Jun. 28, 2018.

(30) Foreign Application Priority Data

Jun. 29, 2017 (JP) .............................. JP2017-127137
Oct. 20, 2017 (JP) .............................. JP2017-203450

(51) Int. Cl.
*G06F 40/174* (2020.01)
*G06F 40/242* (2020.01)
(Continued)

(52) U.S. Cl.
CPC .......... *G06F 40/174* (2020.01); *G06F 40/242* (2020.01); *G06F 40/295* (2020.01); *G10L 15/26* (2013.01)

(58) Field of Classification Search
CPC ..... G06F 17/243; G06F 17/278; G10L 15/265
See application file for complete search history.

(56) References Cited

U.S. PATENT DOCUMENTS 8,341,152 B1 * 12/2012 Bates ................... G06F 16/7837
707/736
2008/0163090 A1 * 7/2008 Cortright .............. G06F 3/0481
715/771
(Continued)

FOREIGN PATENT DOCUMENTS

EP 3324305 5/2018
JP 2001-306793 11/2001
(Continued)

OTHER PUBLICATIONS

"Office Action of Japan Counterpart Application," with English translation thereof, dated Sep. 3, 2019, p. 1-p. 12.
(Continued)

*Primary Examiner* — Scott T Baderman
*Assistant Examiner* — Seung Woon Jung
(74) *Attorney, Agent, or Firm* — JCIPRNET

(57) ABSTRACT

A coordination server has a text information acquisition unit acquiring text information from a mobile terminal, a keyword extraction server references dictionary information indicating a keyword which is a target of extraction, extracts keywords that correspond to the text information, and has an extraction unit extracting keywords corresponding to the acquired text information and an identification unit identifying one input item among a plurality of input items, and a creation server has a creation unit creating a business form by entering the extracted keywords into the identified input item.

16 Claims, 8 Drawing Sheets

(51) Int. Cl.
*G06F 40/295* (2020.01)
*G10L 15/26* (2006.01)

(56) References Cited

U.S. PATENT DOCUMENTS

| | | | |
|---|---|---|---|
| 2010/0180184 | A1 | 7/2010 | Kitamaru |
| 2013/0110518 | A1* | 5/2013 | Gruber .................... G06F 9/54 704/275 |
| 2014/0101261 | A1* | 4/2014 | Wu .................... G06Q 10/107 709/206 |
| 2014/0316772 | A1 | 10/2014 | Koll et al. |
| 2015/0317388 | A1* | 11/2015 | Roh .................... G06F 16/334 707/722 |
| 2016/0034253 | A1* | 2/2016 | Bang .................... G06F 9/5044 715/728 |
| 2016/0062732 | A1 | 3/2016 | Jaygar et al. |
| 2017/0180284 | A1* | 6/2017 | Smullen ................ H04L 67/322 |
| 2017/0185255 | A1* | 6/2017 | Brunswig ............. G06F 17/278 |
| 2018/0182382 | A1* | 6/2018 | Lee .................... G06F 17/2785 |
| 2018/0301222 | A1* | 10/2018 | Dew, Sr. ................ G06Q 50/24 |

FOREIGN PATENT DOCUMENTS

| | | |
|---|---|---|
| JP | 2004295818 | 10/2004 |
| JP | 2010165068 | 7/2010 |
| JP | 2010186431 | 8/2010 |
| JP | 2010267083 | 11/2010 |
| JP | 2011242726 | 12/2011 |
| JP | 2013101531 | 5/2013 |
| JP | 2014115857 | 6/2014 |
| JP | 2014170524 | 9/2014 |
| JP | 2015014854 | 1/2015 |
| JP | 2015102938 | 6/2015 |
| JP | 2015211403 | 11/2015 |
| KR | 20160027419 | 3/2016 |
| WO | 2017010506 | 1/2017 |

OTHER PUBLICATIONS

"Office Action of Korea Counterpart Application," with English translation thereof, dated Sep. 11, 2019, p. 1-p. 11.
"International Search Report (Form PCT/ISA/210) of PCT/JP2018/024614," dated Sep. 4, 2018, with English translation thereof, pp. 1-5.
"Written Opinion of the International Searching Authority (Form PCT/ISA/237) of PCT/JP2018/024614," dated Sep. 4, 2018, with English translation thereof, pp. 1-18.
"Office Action of Korea Counterpart Application", dated Mar. 27, 2020, with English translation thereof, pp. 1-10.
"Search Report of Europe Counterpart Application", dated Apr. 2, 2020, pp. 1-8.
"Office Action of Europe Counterpart Application", dated Nov. 19, 2020, pp. 1-7.
"Office Action of Korea Counterpart Application", dated Oct. 20, 2020, with English translation thereof, pp. 1-8.

* cited by examiner

| Daily Report | Department | Sales |
|---|---|---|
| | Name of PIC | A |

| Reporting Date | 2017/06/02 | Clock In Time | | Clock Out Time | |
|---|---|---|---|---|---|

| Overview |
|---|
| |

| Today's Activity | | |
|---|---|---|
| Date/Time | Tasks | Description of Tasks |
| | | |
| | | |
| | | |
| | | |

| Self-Reflection |
|---|
| Forgot to bring business cards |

| Schedule |
|---|
| Attend seminar |

| Reviewed by | Supervisor 1 | Supervisor 2 | Supervisor's Comments |
|---|---|---|---|
| | | | |

INFORMATION INPUT METHOD, INFORMATION INPUT APPARATUS, AND INFORMATION INPUT SYSTEM

CROSS-REFERENCE TO RELATED APPLICATIONS

The present application is a continuation application of International Application number PCT/JP2018/024614, filed on Jun. 28, 2018, which claims priority under 35 U.S.C § 119(a) to Japanese Patent Application No. 2017-127137, filed on Jun. 29, 2017 and Japanese Patent Application No. 2017-203450, filed on Oct. 20, 2017. The content of these applications are incorporated herein by reference in their entirety.

TECHNICAL FIELD

The present invention relates to an information input method, an information input apparatus, and an information input system.

BACKGROUND OF THE INVENTION

Conventionally, a sales rep or a worker conducting tasks in a workplace creates business forms such as daily reports. For example, Japanese Unexamined Patent Application Publication No. 2001-306793 (hereinafter Patent Document 1) discloses that a sales rep creates a daily report by starting up his own terminal, and inputs data in each cell of a daily report sheet which is displayed when a creation of a daily report is selected from the menu in a system.

When a sales rep, a worker, or the like creates a business form, he conducts an operation of creating the business form using the menu, and further inputs data by designating each input item in the business form sheet, as mentioned in Patent Document 1. However, such tasks were troublesome for a creator of a business form. Also, when there are a number of input items, not all the input items are displayed at once on a display area of the terminal. In such a case, scrolling in order to input data to each input item was also troublesome.

BRIEF SUMMARY OF THE INVENTION

This invention focuses on these points, and an object of the invention is to provide an information input method, an information input apparatus, and an information input system which enable a user to easily input information.

An information input method according to the first aspect of the present invention may be performed by one or more computers and may include a test information acquiring step of acquiring text information from a terminal; an extracting step of extracting keywords corresponding to the acquired text information by referencing dictionary information indicating keywords to be extracted; an identifying step of identifying one input item from among a plurality of input items into which a piece of information is entered; and an entering step of entering the extracted keywords into the identified input item.

An information input apparatus according to the second aspect of the present invention includes a text information acquisition unit that acquires text information from a terminal; an extraction unit that extracts keywords corresponding to the acquired text information by referencing dictionary information indicating keywords to be extracted; an identification unit that identifies one input item from among a plurality of input items into which a piece of information is input; and a creation unit that enters the extracted keywords into the identified input item.

An information input system according to the third aspect of the present invention includes a terminal and a server group, wherein the terminal transmits text information to the server group, and acquires, from the server group, a piece of information relevant to a plurality of input items to which the information is input, and the server group has a text information acquisition unit that acquires the text information from the terminal, an extraction unit that extracts keywords corresponding to the acquired text information by referencing dictionary information indicating keywords to be extracted, an identification unit that identifies one input item from among a plurality of input items, a creation unit that enters the extracted keywords into the identified input item, and a message output unit that outputs, to the terminal, a piece of information relevant to the plurality of input items into which the keywords are entered.

BRIEF DESCRIPTION OF THE DRAWINGS

FIG. 4 shows an example of a business form according to the present embodiment.

FIGS. 5A and 5B each show an example of the business form displayed on the chat screen according to the present embodiment.

DETAILED DESCRIPTION OF THE INVENTION

Hereinafter, the present invention will be described through exemplary embodiments of the present invention, but the following exemplary embodiments do not limit the invention according to the claims, and not all of the combinations of features described in the exemplary embodiments are necessarily essential to the solution means of the invention.

[Outline of Business Form Creation System S]

Figure 1:
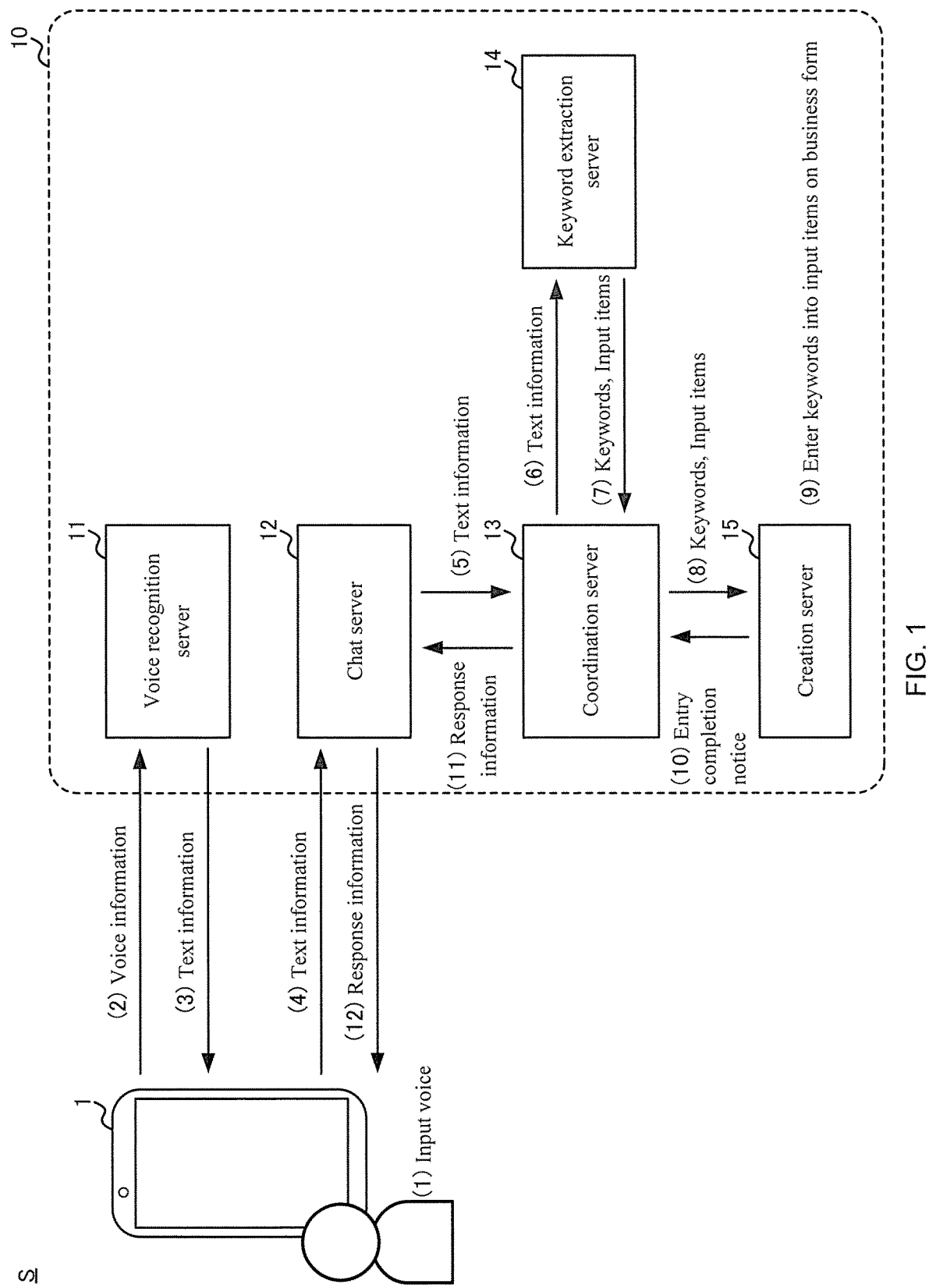
FIG. 1 shows an outline of a business form creation system according to the present embodiment.

FIG. 1 shows an outline of a business form creation system S according to the present embodiment. The business form creation system S includes a terminal 1 and a server group 10, and is a system for creating various business forms such as a daily report in a format with which a user and a chatbot chat via a chat interface. Business forms that the business form creation system S creates are electronic data including character strings, for example, the daily report, an invoice, or the like. The business form creation system S functions as an information input system. The business form creation system S may be a system for inputting information in a work system, for example, a sales force automation (SFA) system, a customer relationship management (CRM) system, or the like.

The terminal 1 is a computer that a client (hereinafter referred to as a user) who makes use of the business form creation system S uses. The terminal 1 is, for example, a mobile terminal of a smartphone or a laptop. It should be noted that, in the present embodiment, the terminal 1 is not limited to the mobile terminal and may be a car navigation device provided in a vehicle. The terminal 1 is not limited to the mobile terminal and the car navigation device but may also be any device as long as that device includes a function of transmitting text information to the server group 10.

The server group 10 includes a voice recognition server 11, a chat server 12, a coordination server 13, a keyword extraction server 14, and a creation server 15. By cooperating with each other, the voice recognition server 11, the chat server 12, the coordination server 13, the keyword extraction server 14, and the creation server 15 create various business forms.

In the present embodiment, a chat screen on which a chatbot for creating the business form and the user of the terminal 1 conduct chats is displayed on a display unit of the terminal 1. The user of the terminal 1 inputs voice to the terminal 1, for example, while the chat screen is displayed ((1) of FIG. 1).

The terminal 1 transmits voice information indicating voice input by the user to the voice recognition server 11 ((2) of FIG. 1). The voice recognition server 11 converts the voice information into text information and transmits the text information to the terminal 1 ((3) of FIG. 1).

Upon receiving the text information from the voice recognition server 11, the terminal 1 inputs the received text information to an input field for the text information provided on the chat screen. The terminal 1 transmits the text information input to the input field to the chat server 12 ((4) of FIG. 1). The chat server 12 transmits the received text information to a server corresponding to the chatbot that is a chat partner of the user of the terminal 1. Here, the chat server 12 transmits the text information to the coordination server 13 ((5) of FIG. 1).

Upon receiving the text information from the chat server 12, the coordination server 13 transmits the text information to the keyword extraction server 14 ((6) of FIG. 1). Upon receiving the text information, the keyword extraction server 14 references the pre-stored dictionary information 144, extracts keywords that correspond to the text information, and identifies an input item on the business form into which the keywords are to be entered. The keyword extraction server 14 transmits the identified keywords and input item to the coordination server 13 ((7) of FIG. 1).

Upon receiving the keywords and the input item from the keyword extraction server 14, the coordination server 13 transmits the keywords and the input item to the creation server 15 ((8) of FIG. 1). Upon receiving the keywords and the input item from the coordination server 13, the creation server 15 enters the received keywords into the input item on the business form ((9) of FIG. 1). In response to the entry of the keywords, the creation server 15 transmits an entry completion notice to notify that the keywords have been entered ((10) of FIG. 1).

In response to the receiving of the entry completion notice from the creation server 15, the coordination server 13 transmits response information that shows the user of the terminal 1 that the keywords have been entered to the terminal 1 via the chat server 12 ((11) and (12) of FIG. 1).

In this way, the user of the terminal 1 can easily carry out the creation of a business form in the format of conducting conversations with the chatbot via the chat screen.

[Configurations of Various Servers Included in the Server Group 10]

Figure 2:
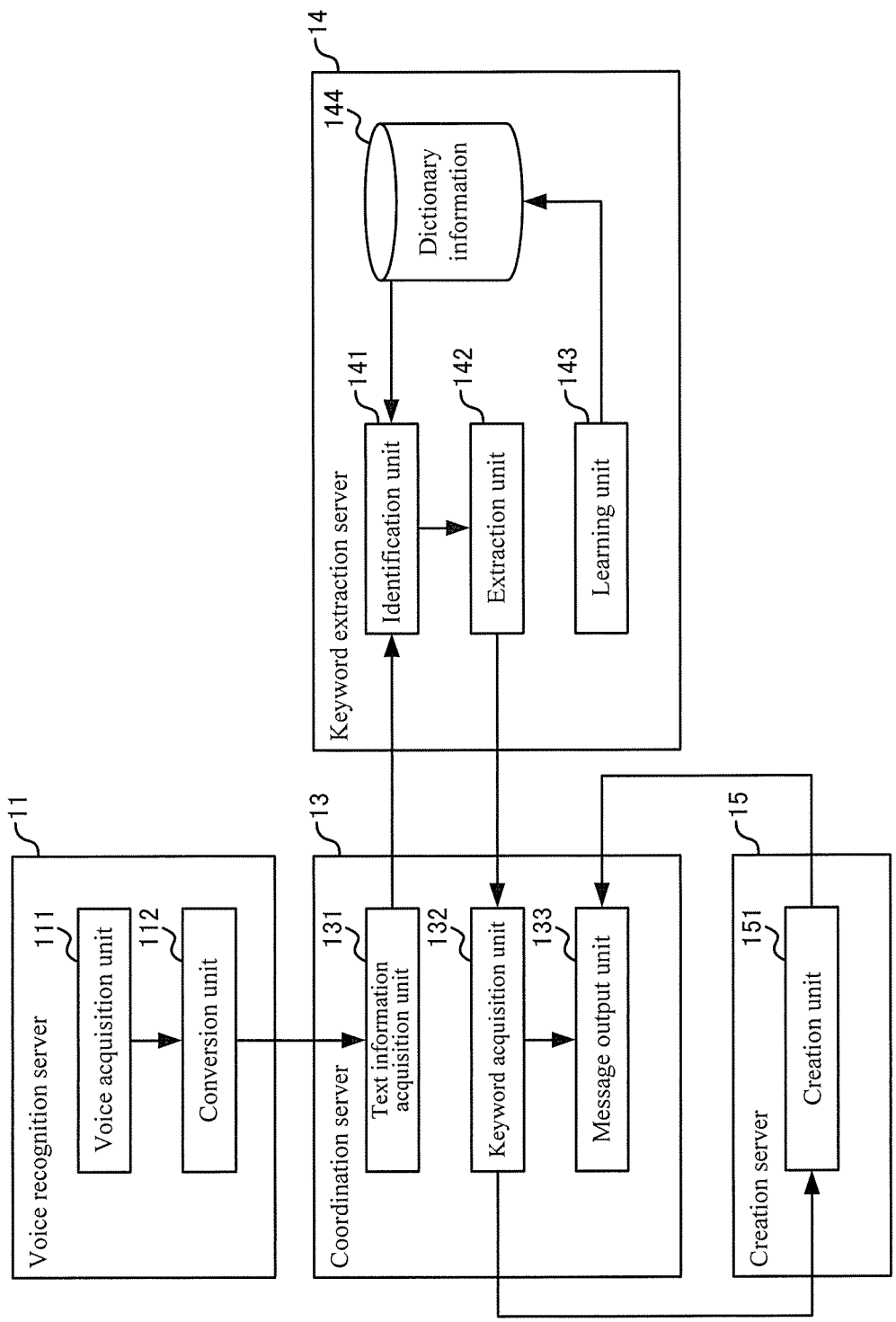
FIG. 2 shows configurations of various servers included in a server group according to the present embodiment.

Next, configurations of various servers included in the server group 10 will be described. FIG. 2 shows the configurations of various servers included in the server group 10 according to the present embodiment.

The various servers included in the server group 10 each have a memory unit (not shown) and a control unit (not shown). The memory units of various servers are storage media, for example, a ROM, a RAM, a hard disk, and the like. The memory units of various servers store programs to be executed by the control units.

The control unit is a CPU, for example. The control unit controls functions according to the respective servers by executing various programs stored in the memory unit or programs read from an external device via communication networks.

As shown in FIG. 2, the control unit of the voice recognition server 11 functions as a voice acquisition unit 111 and a conversion unit 112. The control unit of the coordination server 13 functions as a text information acquisition unit 131, a keyword acquisition unit 132, and a message output unit 133.

The control unit of the keyword extraction server 14 functions as an extraction unit 142, an identification unit 141, and a learning unit 143. The control unit of the creation server 15 functions as a creation unit 151.

Hereinafter, the detailed functions of the voice acquisition unit 111, the conversion unit 112, the text information acquisition unit 131, the keyword acquisition unit 132, the message output unit 133, the identification unit 141, the extraction unit 142, and the creation unit 151 will be described.

The voice acquisition unit 111 acquires voice information indicating the voice that the user emitted. Specifically, the voice acquisition unit 111 acquires the voice information indicating the voice emitted by the user from the terminal 1 via a user interface that displays, in a conversational form, (i) the text information converted from the voice input by the user of the terminal 1 and (ii) the text information output by the coordination server 13 which carries out an utterance function of the chatbot for generating the business form.

Figure 3A:
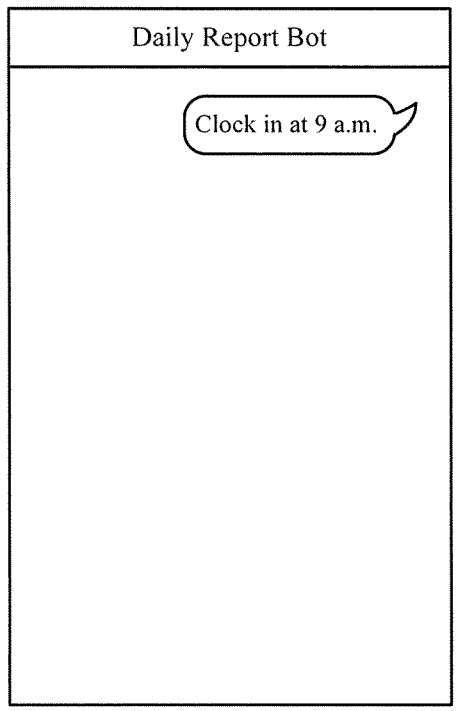
FIGS. 3A and 3B each show an example of a chat screen of the present embodiment.
Figure 3B:
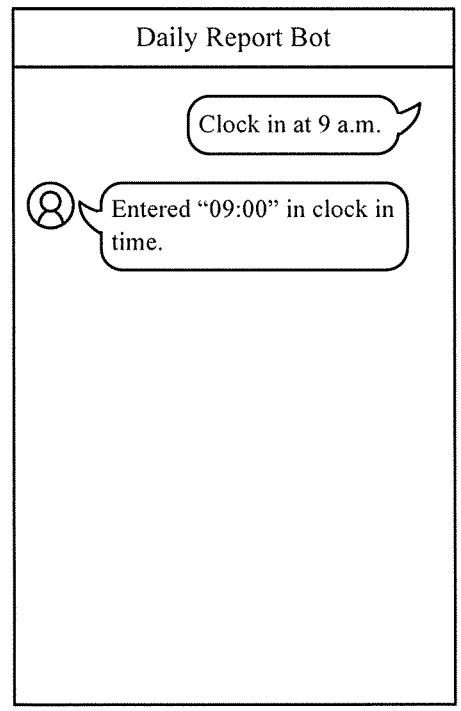

Here, the user interface is the chat screen by which the user of the terminal 1 and the chatbot conduct chats. FIGS. 3A and 3B each show an example of the chat screen of the present embodiment. If the user of terminal 1 pronounces "Clock in at 9 a.m.," for example, the voice acquisition unit 111 acquires the voice information indicating "clock in at 9 a.m.," which is the voice the user emitted.

The conversion unit 112 analyzes the acquired voice information and converts the acquired voice information into the text information. The conversion unit 112 transmits the converted text information to the terminal 1. For example, the conversion unit 112 converts the voice information indicating "clock in at 9 a.m." into the text information and transmits the converted text information to the terminal 1.

Upon receiving the converted text information from the voice recognition server 11, the terminal 1 inputs the converted text information as a statement of the user on the chat screen. FIG. 3A shows an example of the chat screen to which the converted text information of the voice the user emitted "clock in at 9 a.m." is input. The terminal 1 transmits the input text information to the chat server 12. The chat server 12 transmits the input text information to the coordination server 13 that performs pronunciation corresponding to the chatbot.

The text information acquisition unit 131 of the coordination server 13 acquires the text information from the terminal 1 via the chat server 12. Also, the text information acquisition unit 131 identifies a user ID that identifies the user who inputs the text information. Here, the user ID is an account name of a chat service, for example. The text information acquisition unit 131 transmits the acquired text information to the keyword extraction server 14.

The identification unit 141 of the keyword extraction server 14 identifies one input item from among a plurality of input items included in business form information indicating the business form. For example, the dictionary information 144, in which the input items of the business form and keywords corresponding to the input items are associated, is pre-stored in the memory unit of the keyword extraction server 14. Here, the keywords may be expressed using regular expressions.

Upon receiving the text information from the coordination server 13, the identification unit 141 analyzes the text information and identifies one input item having high relevance with the text information among the plurality of input items included in the dictionary information 144 stored in the memory unit. For example, when the text information is "clock in at 9 a.m.," the identification unit 141 identifies the input item "clock in time" as the input item having high relevance with "clock in" included in the text information.

Here, when the converted text information includes a piece of information designating an input item, the identification unit 141 may identify the input item based on that information. For example, the information designating an input item is a word such as "input" or "designate." When the text information received from the coordination server 13 is "input self-reflection," the word "input" that designates the input item is included in the text information. Therefore, the identification unit 141 identifies the input item "self-reflection" based on the other word "self-reflection" included in the text information.

Also, for example, the information designating the input item may be a name of an input item (name of a person in charge (PIC), self-reflection, schedule, or the like) included in the business form information. When the text information received from the coordination server 13 is "name of PIC is Ichiro Suzuki," the name of input item "name of PIC" is included in the text information. Therefore, the identification unit 141 identifies the input item "name of PIC" on the basis of the "name of PIC" included in the text information. It should be noted that the information designating the input item is not limited to a piece of information that matches the names of input items included in the business form information. For example, if a piece of information similar to the name of input item (e.g., "PIC," "in charge," or the like, for the name of input item "name of PIC") is input, the identification unit 141 may identify that input item.

Here, the identification unit 141 may identify an input item if a piece of information indicating a predetermined instruction is included in the text information. For example, the information indicating the predetermined instruction is words such as "what's next?" which indicate confirming of the input item into which the keywords will be entered next. If a piece of information for confirming the input item into which the keywords will be entered next is included in the text information as the predetermined instruction while the input identification unit 141 is receiving an entry for a certain input item, the identification unit 141 identifies the input item receiving the entry. For example, when "what's next?" is included in the text information received from the coordination server 13 while the input item receiving the entry is "name of PIC," the identification unit 141 identifies "name of PIC" as the input item receiving the entry.

Also, for example, the information indicating the predetermined instruction may be a word such as "skip" that indicates skipping of an entry of keywords for one input item. When the text information includes, as the predetermined instruction, a piece of information for skipping the entry of keywords for one input item while receiving the entry for one input item, the identification unit 141 identifies input items other than the one input item indicated by a message output from the coordination server 13.

Suppose, for example, that the identification unit 141 receives the text information including "skip" from the coordination server 13 after the message (for example, "who is the PIC?") relevant to the input item "name of PIC" identified on the basis of "what's next" included in the text information is output to the terminal 1. Also, suppose, for example, that an input order of keywords is fixed for the plurality of input items included in the business form information, and as the input order of keywords, the input item "self-reflection" follows the input item "name of PIC." In this case, the identification unit 141 identifies the input item "self-reflection," to which the keywords is to be entered following the input item "name of PIC," as an input item other than the input item "name of PIC" indicated by the message that the coordination server 13 outputs to the terminal 1. Also, for example, the identification unit 141 may move the entry order of the keywords of the skipped input item "name of PIC" to the last position.

Incidentally, in a case where the user usually skips the entry of keywords for a certain input item when creating the business form, the entry of keywords for that input item is likely to be skipped again. Then, after identifying one input item, the identification unit 141 references input tendency information indicating the user's input tendency toward the input items and may identify input items other than the identified one input item when that identified input item is highly likely to be skipped. For example, the input tendency information, in which the input items in the business form and a piece of information indicating the possibility of the input items being skipped (e.g., a numerical value indicating the probability of being skipped) are associated, is pre-stored in the memory unit of the keyword extraction server 14.

For example, the identification unit 141 determines that the probability that skipping of entering keywords correspond to the input item "self-reflection" is high when the numerical value indicating the probability exceeds the predetermined threshold value in the input tendency information, in which the numerical value is correlated with the identified input item "self-reflection." In the keyword extraction server 14, the numerical value of a high probability of skipping the entry of keywords corresponding to the input items is set as the predetermined threshold value in advance. Also, the identification unit 141 identifies the input items (e.g., name of PIC, schedule, and the like) other than the identified input item. In this way, the identification unit 141 enables the creation of business forms easily because the effort of instructing the skipping of the identified input item when creating the business form is eliminated.

Also, the message output unit 133 of the coordination server 13 that will be described below may reference the input tendency information and output a message of confirming whether to skip an input item to the terminal 1 if the one input item identified by the identification unit 141 is highly likely to be skipped.

The extraction unit 142 references the dictionary information 144 stored in the memory unit and extracts the keywords corresponding to the text information received from the coordination server 13. In this context, "corresponding to the text information" not only implies that keywords are included in the text information but also implies that the keywords and the text information are highly relevant.

In response to the identification unit 141 identifying one input item, the extraction unit 142 extracts the keywords corresponding to the one input item. For example, when the text information is "clock in at 9 a.m.," the identification unit 141 identifies the input item "clock in." When the clock time is associated with the input item "clock in" in the dictionary information 144 stored in the memory unit, the extraction unit 142 extracts the keyword "09:00" based on "9 a.m." included in the text information.

Here, if a piece of information designating the input item such as "input self-reflection" is included in the text information, the extraction unit 142 does not need to extract keywords from the text information. Also, if the keywords corresponding to the input items indicated by the information designating the input item are included in the text information including the information designating input item, the extraction unit 142 may extract keywords from the text information. For example, if the input item "name of PIC" is identified by the identification unit 141 on the basis of the "name of PIC" included in the text information "name of PIC is Ichiro Suzuki," the extraction unit 142 extracts "Ichiro Suzuki" from the text information as the keywords corresponding to the identified input item.

Also, if the extraction unit 142 references the input tendency information indicating the user's input tendency toward the input items and determines that there are keywords highly likely to be entered for the one input item identified by the identification unit 141, the extraction unit 142 may extract the keywords from the input tendency information. For example, the input tendency information, in which the input items of the business form and the keywords of input candidates are associated, is pre-stored in the memory unit of the keyword extraction server 14.

Suppose that the user always enters the keywords "Ichiro Suzuki" into the input item "name of PIC," and the input item "name of PIC" and the keywords "Ichiro Suzuki" that is an input candidate are associated in the input tendency information. In this case, the extraction unit 142 extracts the keywords "Ichiro Suzuki" associated with the input item "name of PIC" identified by the identification unit 141 in the input tendency information. In this way, the extraction unit 142 can reduce the user's burden of entering the same keywords every time when creating the business form.

Also, the extraction unit 142 calculates an evaluation value indicating the relationship between the extracted keywords and the identified input item. Here, the higher the relevance between the keywords and the input item, the higher the evaluation value.

It should be noted that accuracy of the evaluation value can be improved by the learning unit 143 performing machine learning on the dictionary information 144 using teaching data in which the text information and the keywords corresponding to the text information are combined. For example, there is a case where keywords are not included in the text information, and the keywords and the text information seem to be irrelevant. Even in this case, the learning unit 143, by learning such combinations of keywords and text information as teaching data in advance, can extract the keywords as the keywords with a high evaluation value when the text information is input.

Here, the learning unit 143 may use a combination of the text information acquired from the terminal 1 and the keywords extracted by the extraction unit 142 as teaching data, and thus the learning unit 143 may perform learning of the dictionary information 144 using the teaching data. In this way, the more the user uses the chat service, the more calculation accuracy of the evaluation value improves.

Also, the learning unit 143 uses a combination of (i) the text information from which the keywords are extracted, (ii) text information acquired prior to the text information, and (iii) the extracted keywords, acquired from the terminal 1, as teaching data and thus the learning unit 143 may perform learning of the dictionary information 144 using the teaching data. In this way, the keyword extraction server 14 can calculate the evaluation value according to the context indicating the text information being repeatedly input. By this, the keyword extraction server 14 can set the evaluation value to be high if the text information is input in the same flow day by day and set the evaluation value to be low if the text information is input in a flow different from the usual.

Also, the learning unit 143 may use a combination of (i) input history information including whichever keywords correspond to one input item and the information indicating the predetermined instruction for one input item and (ii) one input item acquired from the terminal 1 as teaching data, and thus the learning unit 143 may learn the user's input tendency for the input items.

For example, if the learning unit 143 learns the input tendency of a user who skips the entry of keywords for input item every time, the keyword extraction server 14 may omit the entry of keywords for the input item which the user is highly likely to instruct to skip. Also, for example, if the learning unit 143 learns the input tendency of a user who enters the same keywords for a certain input item every time, the keyword extraction server 14 may enter the keywords based on the user's input tendency without the user inputting the text information for the input item. This enables to reduce the user's burden of entering the same keywords for a certain input item. The learning unit 143 may learn the user's input tendency for each of a business type, a company, or a user and may store a learning model corresponding to each of them in the memory unit of the keyword extraction server 14.

The extraction unit 142 transmits the keyword information indicating the extracted keywords, the calculated evaluation value, and the input item identified by the identification unit 141 to the coordination server 13. The keyword acquisition unit 132 of the coordination server 13 receives the keyword information indicating the keywords, the evaluation value, and the input item from the keyword extraction server 14. The keyword acquisition unit 132 transmits the keyword information and the user ID of the terminal 1 acquired by the text information acquisition unit 131 to the creation server 15.

It should be noted that the identification unit 141 identifies one input item from text information acquired from the terminal 1, and the extraction unit 142 identifies one keyword from the text information, but the present embodiment is not limited to this. The identification unit 141 may divide the acquired text information acquired from the terminal 1 into a plurality of pieces of subtext information and may identify input items corresponding to the pieces of subtext information. Then, the extraction unit 142 may extract keywords corresponding to the input items identified for the respective pieces of subtext information.

Here, if the conjunctions such as "also," "besides," or conjunctive particles such as "thus" are included in the text information acquired from the terminal 1, the identification unit 141 may divide the text information into pieces of subtext information. In this way, if the contents corresponding to a plurality of input items are included in the text information, the keyword extraction server 14 can acquire the input items and keywords corresponding to the respective contents.

Also, the identification unit 141 identifies one input item from the text information acquired from the terminal 1, but the present embodiment is not limited to this. For example, an entry order of keywords may be set in advance for a plurality of input items included in the business form information. Then, on the basis of the entry order, the identification unit 141 may identify one input item into which keywords are not entered. In this way, keywords are entered in sequence for the plurality of input items provided on the business form. This enables the user to enter the keywords into the plurality of input items provided on the business form without omission.

The creation unit 151 creates the business form by entering keywords extracted from the extraction unit 142 into the input item identified by the identification unit 141. FIG. 4 shows an example of a business form according to the present embodiment. The business form information (business form file) indicating the business form is, for example, associated with a user ID and stored in the memory unit of the creation server 15.

Upon receiving the keyword information and the user ID from the coordination server 13, the creation unit 151 references the memory unit and identifies the business form information associated with the user ID. The creation unit 151 updates the business form by entering the keywords indicated by the keyword information into the input item indicated by the received keyword information from among the plurality of input items included in the identified business form information. In this manner, the creation unit 151 creates the business form by updating the business form information stored in the memory unit in association with the received user ID.

In response to the entering of the keywords, the creation unit 151 transmits, to the coordination server 13, the entry completion notice indicating that the keywords have been entered. Upon receiving the entry completion notice from the creation server 15, the message output unit 133 transmits, to the terminal 1 via the chat server 12, a response message indicating that the keywords have been entered. FIG. 3B shows an example where the response message output by the message output unit 133 is displayed on the terminal 1. Based on the message indicated in FIG. 3B, the user of the terminal 1 can confirm that the keyword "09:00" was entered into the input item "clock in time" of the business form.

As mentioned above, the keywords are entered into the business form by the user of terminal 1 emitting voice on the chat screen. In this way, the user can easily carry out the creation of a business form by conducting conversations with the chatbot via the chat screen.

Here, the business form created by the creation unit 151 may be displayed on the chat screen. The chat screen in this case includes a business form view displaying the business form created by the creation unit 151, the text information input by the user of the terminal 1, and a chat view displaying, in a conversational form, predetermined messages output to the terminal 1. After creating the business form, the creation unit 151 displays the business form screen on the business form view of the chat screen by transmitting the business form screen indicating the created business form to the terminal 1 via the coordination server 13. Also, upon receiving the entry completion notice from the creation server 15, the message output unit 133 displays the response message on the chat view of the chat screen by transmitting the response message indicating that the keywords have been entered to the terminal 1.

Figures 5A, 5B:
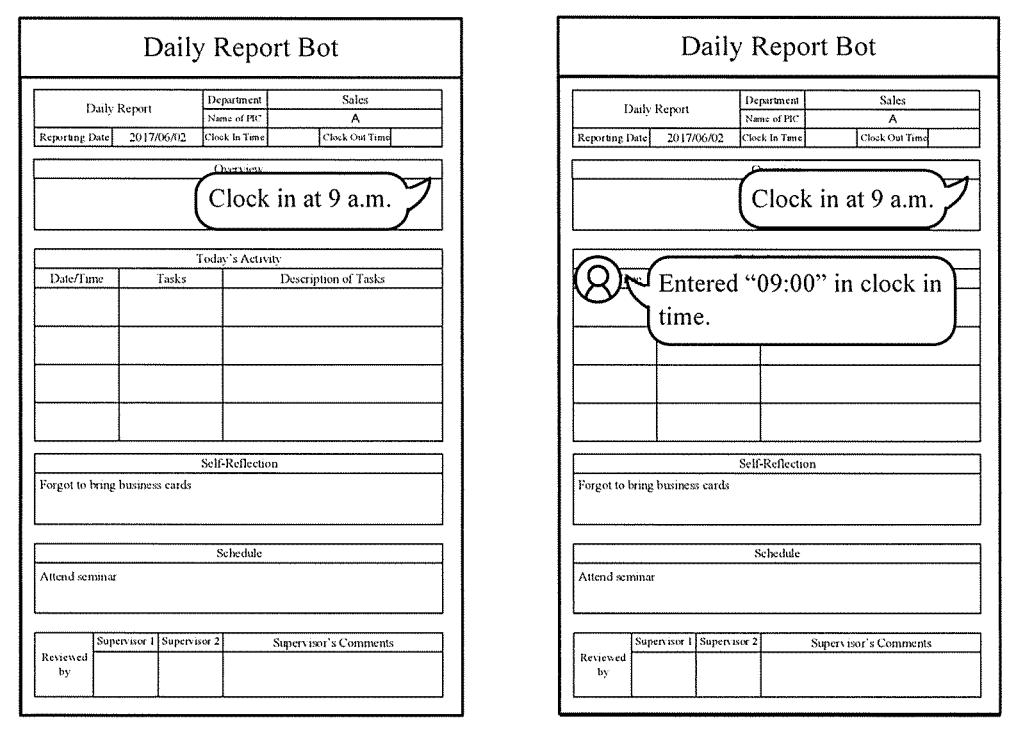

FIGS. 5A and 5B each show an example of the business form displayed on the chat screen according to the present embodiment. As shown in FIG. 5A, the first layer displaying the business form view, and the second layer displaying the chat view in a state where the business form view is visibly superimposed over the first layer on the chat screen. For example, by transmitting a piece of information indicating a preset transmittance to the terminal 1, the message output unit 133 displays the chat view of the second layer with the preset transmittance. In this way, the message output unit 133 displays, on the chat screen, the business form view of the business form screen through the chat view displayed with the preset transmittance.

The creation unit 151 updates the business form on the basis of the keywords entered into the input item included in the business form information each time the keywords extracted based on the text information input via the chat view are entered into the identified input item. The creation unit 151, as shown in FIG. 5A, updates the business form when the text information "clock in at 9 a.m." input by the user is input to the chat view by entering the keyword "09:00" extracted based on the text information in the input item "clock in time" that is included in the business information and identified on the basis of the keywords.

Then, as shown in FIG. 5B, the creation unit 151 displays, on the business form view displayed on the terminal 1, the updated business form in which the keyword "09:00" is entered into the input item "clock in time" in the business form view of the chat screen. Also, the message output unit 133 displays the response message, "Entered '09:00' in clock in time," on the chat view of the chat screen upon receiving the entry completion notice from the creation server 15. In this way, the user can easily carry out the creation of a business form while looking at the business form being updated each time the text information is input.

Also, in the business form screen showing the updated business form, the creation unit 151 may display the input item in which the keywords are entered in a different state from the other input items (for example, adding color to the input item column). This makes it easier for the user to recognize the updated input items in the business form screen.

Also, the message output unit 133 may make the message to be output to the terminal 1 display in a manner that the message does not overlap with an area where the input items in which the keywords have been entered is displayed at the time of updating the business form screen. For example, the message output unit 133 acquires, from the creation unit 151, position information indicating a position of an input item into which the keywords have been entered on the updated business form screen and transmits the acquired position information to the terminal 1. In this way, for example, the terminal 1 moves the message displayed on the chat screen to a position where the message does not overlap with the position indicated in the position information and displays the message there. By this, the user can recognize the updated input items in the business form screen even in the case where one or more messages are displayed on the chat screen.

Also, the message output unit 133 may display the chat view of the chat screen in a manner that the position of the chat view is moved in response to the user's operation. In this way, even if the number of messages to be displayed on the chat view of the chat screen increases, the user can check the business form displayed on the business form screen by moving the chat view to increase a display area of the business form screen.

It should be noted that in a case where the text information acquired from the terminal 1 such as "input self-reflection" does not include the information designating the input item, the keywords are not extracted from the text information. In this case, the message output unit 133 outputs, to the terminal 1, a message prompting input of information to the input items identified by the identification unit 141. Here, the message output unit 133 may include a piece of information indicating the number of characters capable of being entered into the input item identified by the identification unit 141. Also, from the text information acquired from the terminal 1 immediately after the message was output by the message output unit 133, the extraction unit 142 may extract the keywords corresponding to the text information and the input item identified by the identification unit 141.

Figure 6A:
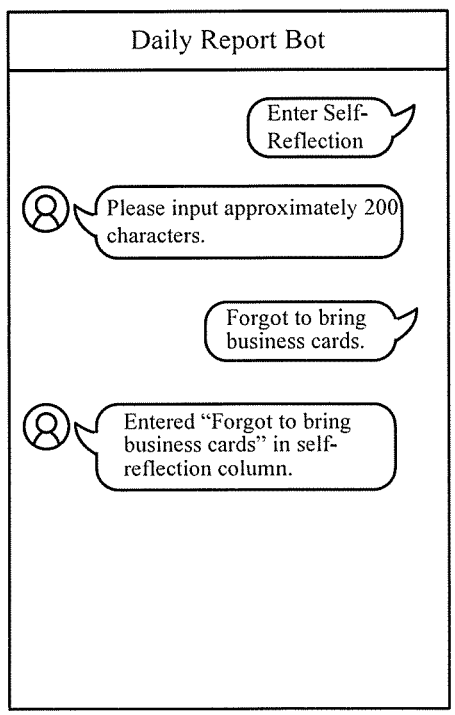
FIGS. 6A and 6B each show another example of a chat screen according to the present embodiment.
Figure 6B:
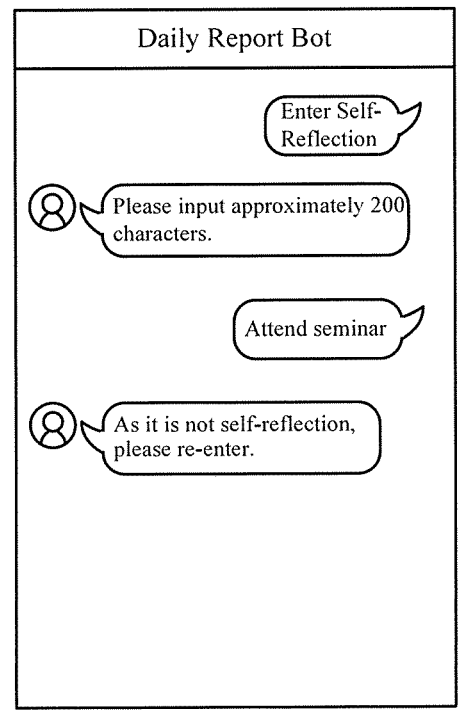

FIGS. 6A and 6B each show another example of the chat screen according to the present embodiment. As shown in FIG. 6A, when the user inputs "input self-reflection," the message output unit 133 outputs, to the terminal 1, the message "Please input approximately 200 characters," which prompts the input of the information to the input item "self-reflection." Then, upon acquiring the text information "forgot to bring business cards" from the terminal 1, the extraction unit 142 extracts the text information itself as keywords. The creation unit 151 enters the keywords "forgot to bring business cards" into the input item "self-reflection," and then the message output unit 133 outputs, to the terminal 1, the response message indicating that the keywords have been entered.

Here, there may be a case where the extracted keywords or the acquired text information does not correspond with the input item. Therefore, the creation unit 151 may enter the extracted keywords into the identified input item if the evaluation value included in the keyword information exceeds the predetermined threshold value, and does not need to enter any keyword into the identified input item if the evaluation value is less than or equal to the predetermined threshold value.

For example, as shown in FIG. 6B, suppose the user inputs "attend seminar" after the message prompting input of information to the input item "self-reflection" is output to the terminal 1. In this case, although the extraction unit 142 extracts the text information "attend seminar" itself, acquired from the terminal 1, as keywords, the evaluation value is low since the relevance between the keywords and the input item "self-reflection" is low. The creation unit 151 is controlled not to enter the extracted keywords into the identified input item if the evaluation value included in the keyword information is less than or equal to the predetermined threshold value.

Also, if the evaluation value is less than or equal to the predetermined threshold value, the message output unit 133 outputs, to the terminal 1, a message indicating that the text information is irrelevant to the identified input item. In FIG. 6B, it can be seen that the message "As it is not self-reflection, please re-enter," indicating that the text information is irrelevant to the identified input item, is displayed.

Also, there is a case where the entered keywords are incorrect. If the text information acquired from the terminal 1 after the response message has been output to the terminal 1 includes a piece of information indicating correction of keywords, the coordination server 13, the keyword extraction server 14, and the creation server 15 correct the keywords entered according to the response message.

For example, if the information indicating correction of keywords is included in the text information acquired after the response message is output to the terminal 1, the identification unit 141 identifies the input item into which the keywords have been entered according to the response message. Here, the information indicating the correction of keywords is character strings such as "correction," "modification," or the like. Also, the extraction unit 142 extracts the keywords corresponding to the identified input item and the evaluation value from the text information. The extraction unit 142 transmits the input item, the text information, and the keyword information including the evaluation value to the coordination server 13.

Also, even if the evaluation value included in the keyword information is less than or equal to the predetermined threshold value, the creation unit 151 may enter the extracted keywords into the identified input item. In this case, the message output unit 133 may output a message indicating that the evaluation value is less than or equal to the threshold value. Suppose that the user input "attend seminar" into the input item "self-reflection." In this case, the message output unit 133 may determine that the relevance between "attend seminar" and "self-reflection" is low and may output to the terminal 1, "Entered 'attend seminar' in self-reflection column. OK?" as the message indicating that the evaluation value is less than or equal to the threshold value.

After that, for example, the user enters "forgot to bring business cards," then the creation unit 151 enters the keywords "forgot to bring business cards" extracted from the text information by the extraction unit 142 into the input item "self-reflection." In this case, the message output unit 133 may determine that the relevance between "forgot to bring business cards" and "self-reflection" is high and may output, to the terminal 1, the response message indicating that the keywords have been entered. In this way, the user can easily recognize that the wrong keywords have been entered into the input item and then make modifications easily by entering the correct keywords.

The keyword acquisition unit 132 of the coordination server 13 transmits the keyword information received from the keyword extraction server 14 and the user ID of the terminal 1 acquired from the text information acquisition unit 131 to the creation server 15. Upon receiving the keyword information and the user ID from the coordination server 13, the creation unit 151 references the memory unit and identifies the business form information associated with the user ID. The creation unit 151 enters the keywords indicated by the keyword information into the input item indicated by the received keyword information from among the plurality of input items included in the identified business form information. Here, since the keywords have already been entered into the input item indicated by the keyword information, the creation unit 151 deletes the keywords and enters the keywords indicated by the keyword information. This corrects the keywords entered according to the response message.

Also, if a piece of information instructing output of the business form information to the terminal 1 is included in the acquired text information, the message output unit 133 outputs the business form information to the terminal 1. Here, the information instructing output of the business form information to the terminal 1 is the character string "show me." Upon acquiring the text information "show me," the message output unit 133 outputs, to the terminal 1, a message including an address stored in the server 15 storing the business form information. The terminal 1, serving as the business form acquisition unit, accesses an area corresponding to an address selected in the creation server 15 in response to the selection of an address included in the message and acquires the business form information.

Figure 7A:
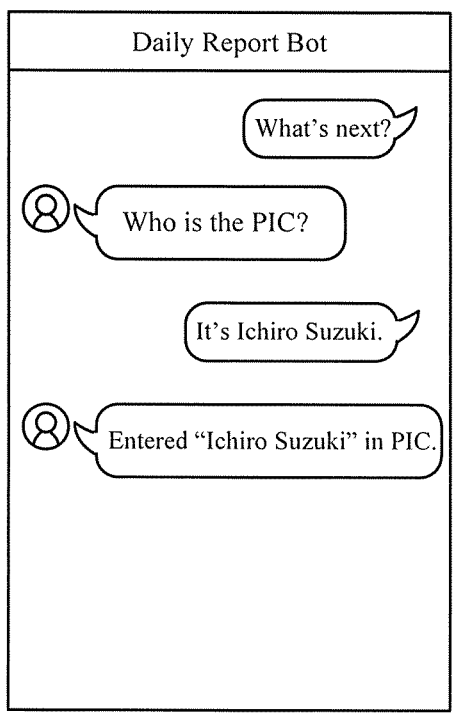
FIGS. 7A and 7B each show yet another example of a chat screen according to the present embodiment.
Figure 7B:
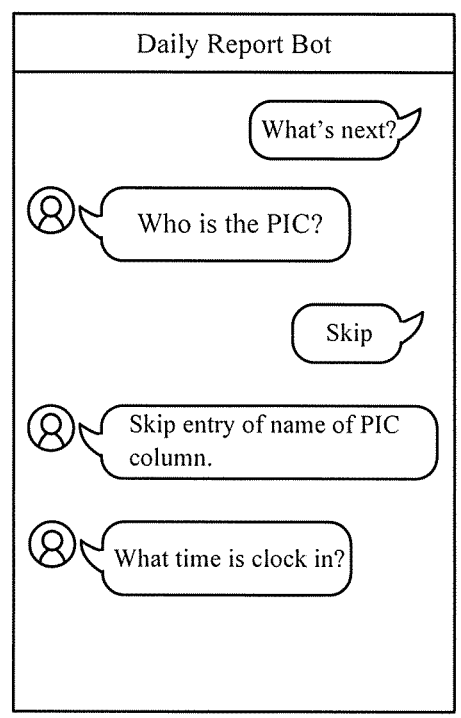

Also, if the identification unit 141 of the keyword extraction server 14 identifies the input item on the basis of the information indicating the predetermined instruction included in the text information, the message output unit 133 outputs the message indicating the identified input item to the terminal 1. FIGS. 7A and 7B each show another example of a chat screen according to the present embodiment.

Suppose that the user inputs "what's next?" while the identification unit 141 is receiving the input item "name of PIC," as shown in FIG. 7A. In this case, the message output unit 133 outputs a message "Who is the PIC?" as the message indicating the identified input item "name of PIC" identified by the identification unit 141 of the keyword extraction server 14 to the terminal 1.

If the text information acquisition unit 131 acquires the text information from the terminal 1 after the message output unit 133 has output the message indicating the input item to the terminal 1, the creation unit 151 of the creation server 15 enters the keywords, extracted by the extraction unit 142 of the keyword extraction server 14 based on the text information, to the identified one input item. As shown in FIG. 7A, suppose that the user inputs "It is Ichiro Suzuki" after the message output unit 133 output the message "Who is the PIC?" to the terminal 1. In this case, the extraction unit 142 extracts the keywords "Ichiro Suzuki" corresponding to the input item "name of PIC" on the basis of the acquired text information "It is Ichiro Suzuki." The creation unit 151 enters the extracted keywords "Ichiro Suzuki" into the input item "name of PIC." Then, the message output unit 133 outputs the response message indicating that the keywords have been entered to the terminal 1.

Also, as shown in FIG. 7B, suppose that the user inputs "Skip" after the message output unit 133 output "who is the PIC?" to the terminal 1. In this case, the message output unit 133 outputs, to the terminal 1, the message "Skip entry of input item column for name of PIC" indicating that the entry of the keywords corresponding to the input item receiving the entry has been skipped. After that, the message output unit 133 outputs, to the terminal 1, "What time is clock out?" as the message indicating the input item (for example clock out) identified as the input items other than the input item "name of PIC" by the identification unit 141.

[Processing of the Business form Creation System S]

Figure 8:
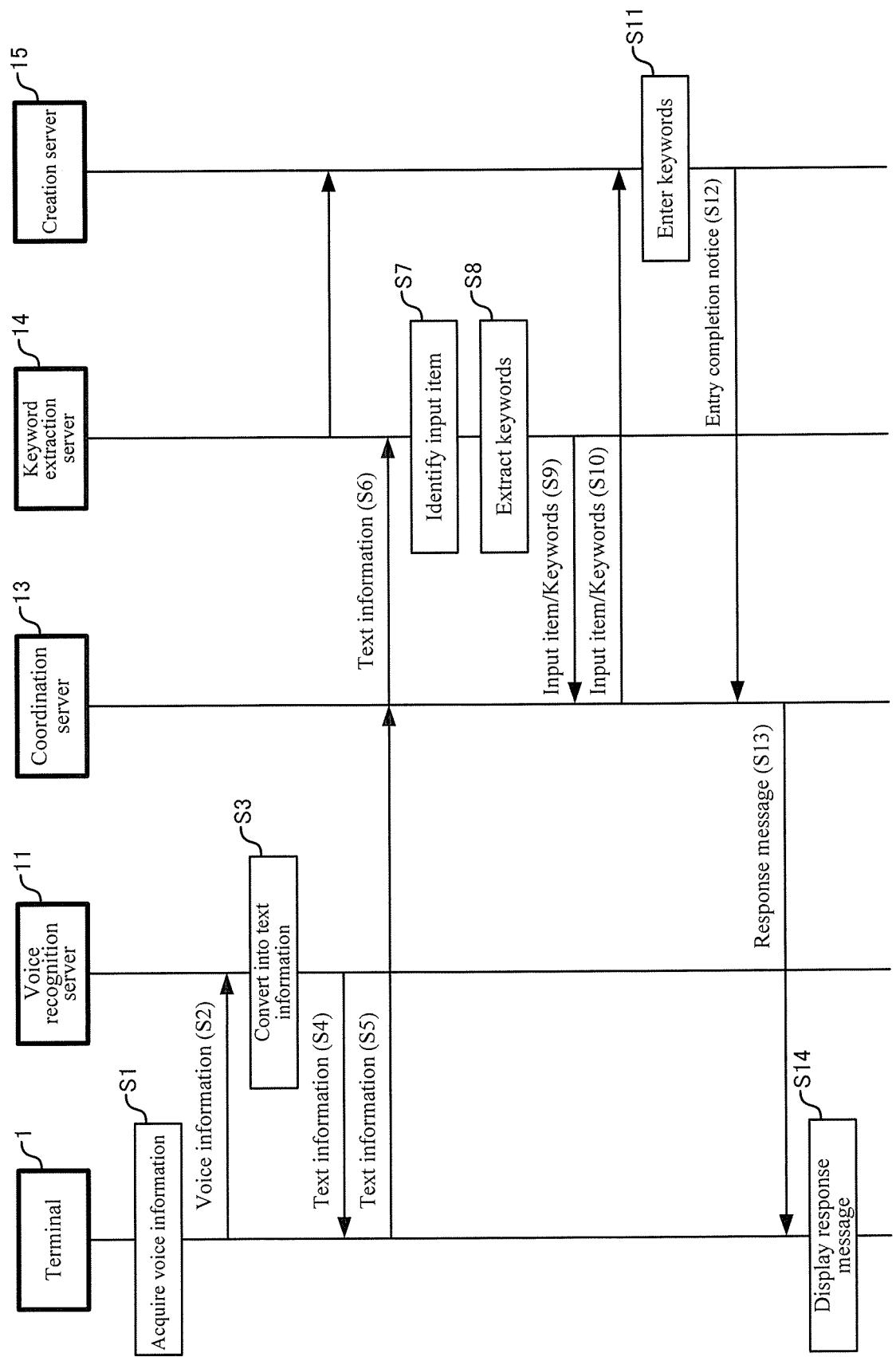
FIG. 8 is a sequence diagram showing processing of a business form creation system according to the present embodiment.

Next, processing of the business form creation system S will be described. FIG. 8 is a sequence diagram showing processing of a business form creation system S according to the present embodiment.

First, the terminal 1 acquires voice information indicating the voice the user emitted (S1). The terminal 1 transmits the acquired voice information to the voice recognition server 11 (S2).

The voice acquisition unit 111 of the voice recognition server 11 acquires the voice information from the terminal 1. The conversion unit 112 converts the acquired voice information into text information (S3) and transmits the text information to the terminal 1 (S4).

Upon receiving the text information, the terminal 1 inputs the text information as a statement of the user on the chat screen. The terminal 1 transmits the text information to the coordination server 13 via the chat server 12 (S5). Upon acquiring the text information from the terminal 1 via the chat server 12, the text information acquisition unit 131 of the coordination server 13 transmits the text information to the keyword extraction server 14 (S6).

Upon receiving the text information from the coordination server 13, the identification unit 141 of the keyword extraction server 14 identifies the input item on the basis of the text information (S7). In response to the identification unit identifying the input item, the extraction unit 142 extracts the keywords corresponding to the input item on the basis of the text information (S8).

The extraction unit 142 transmits the identified input item and the extracted keywords to the coordination server 13 (S9). Upon receiving the input item and the keywords from the coordination server 13, the keyword acquisition unit 132 of the coordination server 13 transmits the input item and the keywords to the creation server 15 (S10).

Upon receiving the input item and the keywords from the coordination server 13, the creation unit 151 of the creation server 15 enters the keyword into the input item of the business form information (S11). In response to the entry of the keywords, the creation unit 151 transmits the entry completion notice indicating that the keywords have been entered to the coordination server 13 (S12).

Upon receiving the entry completion notice from the creation server 15, the message output unit 133 of the coordination server 13 transmits the response message indicating that the keywords have been entered to the terminal 1 via the chat server 12 (S13). Upon receiving the response message, the terminal 1 displays the response message on the chat screen (S14).

Effect of the Present Embodiment

As described above, according to the business form creation system S of the present embodiment, the coordination server 13 acquires the text information from the terminal 1, the keyword extraction server 14 references the dictionary information 144 indicating the keywords to be extracted, extracts the keywords corresponding to the acquired text information, and identifies the input item from among the plurality of input items provided on the business form, and the creation server 15 enters the extracted keywords into the identified input item on the business form. In this way, the user of the terminal 1 can easily carry out the inputting of information in the format of conducting conversations with the chatbot via the chat screen.

The present invention is explained on the basis of the exemplary present embodiments. The technical scope of the present invention is not limited to the scope explained in the above present embodiments and it is possible to make various changes and modifications within the scope of the invention. For example, the specific present embodiments of the distribution and integration of the apparatus are not limited to the above exemplary present embodiments, all or part thereof, can be configured with any unit which is functionally or physically dispersed or integrated.

VARIATION EXAMPLE 1

For example, in the above-mentioned embodiment, the business form creation system S identifies one input item from among the plurality of input items into which a piece of information is input, and creates the business form by entering the extracted keywords into the identified input items. But the present embodiment is not limited to this.

For example, the present embodiment may include an information input system in place of the business form creation system S, in which the information input system may input various pieces of information in the predetermined input form by entering the extracted keywords for the identified input item from among the plurality of input items included in the predetermined input form. Here, the predetermined input form is an application to be performed in the terminal 1 or an input form displayable on the terminal 1 and provided by a web page and the like.

The information input system has the same configuration as that of the business form creation system S. Also, the information input system is different from the business form creation system S in that the creation server 15 of the information input system enters the keywords into the input item provided on the input form, and the information input system is otherwise the same as the business form creation system S.

The information input system receives, from the terminal 1, a selection of an input form to which a piece of information is input from among a plurality of input forms that the information input system can enter by itself. The information input system acquires text information via the chat screen displayed on the terminal 1 and extracts the keywords from the text information. The information input system enters the extracted keywords into the input item corresponding to the keywords from among the plurality of input items included in the selected input form. If a piece of information instructing display of the input form is included in the acquired text information, the information input system outputs, to the terminal 1, a message including an address for displaying a screen including the input form. In response to the address including the message being selected, the terminal 1 accesses the information input system, acquires the screen including the input form, and displays the screen on the display unit. In this way, the user of the terminal 1 can input various information in the predetermined input form in the format of conducting conversations with the chatbot via the chat screen.

VARIATION EXAMPLE 2

Also, the present embodiment may include an information input system in place of the business form creation system S, in which the information input system may input various pieces of information in a table, which is contained in a database, by entering the extracted keywords for the identified input item from among the plurality of input items included in the table. Here, the database, for example, is a database including various systems such as a backbone system.

The information input system has the same configuration as that of the business form creation system S. For example, the information input system is incorporated in the backbone system. Also, the information input system is different from the business form creation system S in that the creation server 15 of the information input system enters the keywords into the table contained in the data base, and the information input system is otherwise the same as the business form creation system S.

The information input system receives types of information to be input in the backbone system from the terminal 1. Then, the information input system acquires the text information via the chat screen displayed on the terminal 1 and extracts the keywords from the text information. The information input system enters the extracted keywords into the input item corresponding to the keywords from among the plurality of input items included in one or more tables corresponding to the selected type of information. If a piece of information instructing display of the input form is included in the acquired text information, the information input system outputs, to the terminal 1, a message including an address for displaying a screen including the information input to the table. In response to the address including the message being selected, the terminal 1 accesses the information input system, acquires the screen including the information input to the table, and displays the screen on the display unit. In this way, the user of the terminal 1 can input various pieces of information into the table contained in the data base in the format of conducting conversations with the chatbot via the chat screen.

Also, for example, the business form creation system S includes the voice recognition server 11, the chat server 12, the coordination server 13, the keyword extraction server 14, and the creation server 15 in the above-mentioned present embodiment, but the present embodiment is not limited to this configuration. Any configurations are acceptable as long as they can achieve the respective functions included in these servers. Further, new exemplary present embodiments generated by arbitrary combinations of them are included in the exemplary present embodiments of the present invention. Further, effects of the new exemplary present embodiments brought by the combinations also have the effects of the original exemplary present embodiments.

What is claimed is:

1. An information input method performed by one or more computers, the method comprising;
   acquiring text information from a terminal on a chat view;
   extracting a keyword corresponding to the acquired text information by referencing dictionary information indicating the keyword to be extracted and the keyword is associated with an input item;
   identifying the input item by designating the name of the input item to the input item from among a plurality of input items into which the acquired text information is entered, the plurality of input items being included in business form information indicating a business form;
   entering the extracted keyword into the identified input item;
   updating the business form based on the extracted keyword entered into the identified input item included in the business form information; and
   displaying a first layer displaying the business form view showing the updated business form, and a second layer overlaid on the first layer, the second layer displaying the chat view with a preset transmittance in a state where the business form view is visible by displaying (i) the text information entered by a user of the terminal and (ii) a predetermined message output from the terminal in a conversational form on the terminal at a position of the updated business form by moving the predetermined message to a position that does not overlap with an area of the input item in which the extracted keyword has been entered on the basis of the position information indicating the position of the input item in which the extracted keyword has been entered on the updated business form view.
2. The information input method according to claim 1, wherein the plurality of input items are provided in a predetermined input form, and the entering includes entering the extracted keyword into the identified input item from among the plurality of input items included on the input form.

3. The information input method according to claim 1, wherein the plurality of input items are included in a table contained in a database, and
the entering includes entering the extracted keyword into the identified input item from among the plurality of input items included in the table.

4. The information input method according claim 1, the method further comprising:
a voice information acquiring of acquiring voice information from the terminal; and
a converting of converting the acquired voice information into text information, wherein
the text information acquiring includes acquiring the text information which was converted in the converting.

5. The information input method according to claim 1, the method further comprising:
a prompt outputting of outputting a message prompting input of the acquired text information corresponding to the identified input item to the terminal, wherein
the extracting includes extracting the keyword corresponding to the text information and the input item from the text information acquired immediately after the message is output.

6. The information input method according to claim 1, wherein the identifying includes identifying the input item from among the plurality of input items based on the acquired text information, and
the extracting includes extracting the keyword corresponding to the input item in response to the input item being identified.

7. The information input method according to claim 1, wherein an input order of the input item is fixed in advance, and
the identifying includes identifying the input item based on the input order.

8. The information input method according to claim 1, wherein the extracting includes calculating an evaluation value indicating a relevance between the text information and the identified input item, and
the entering includes entering the extracted keyword into the identified input item, when the evaluation value exceeds a predetermined threshold value.

9. The information input method according to claim 1, the method further comprising:
a response outputting of outputting a response message indicating that an entry of the keyword is completed to the terminal after the keyword is entered into the identified input item; and
a correcting of correcting the keyword entered according to the response message if the text information acquired after the response message is output to the terminal includes another acquired text information indicating correction of the keyword.

10. The information input method according to claim 1, the method further comprising:
an identification message outputting of outputting the predetermined message to the terminal, wherein the identifying identifies the input item if the piece of information indicating a predetermined instruction is included in the text information, and
the identification message outputting includes outputting a message to the terminal, the message indicating the identified input item which the identifying identified.

11. The information input method according to claim 1, wherein the identifying includes identifying input items other than the identified input item if the input item is highly like to be skipped as a result of referencing input tendency information indicating an input tendency of the user toward the input items.

12. The information input method according to claim 1, wherein the extracting includes extracting the keyword highly likely to be entered to the input item which the identifying identified as a result of referencing input tendency information indicating an input tendency of the user toward the input item.

13. The information input method according to claim 1, the method further comprising
a learning of learning the dictionary information based on teaching data in which the text information and the keyword corresponding to the text information are combined.

14. The information input method according to claim 13, wherein the learning includes learning an input tendency of the user toward the input item using a combination of (i) input history information including either the keyword corresponding to the input item or the acquired text information indicating the predetermined instruction for the input item and (ii) the input item acquired from the terminal, as teaching data.

15. An information input apparatus comprising:
a text information acquisition unit that acquires text information from a terminal on a chat view;
an extraction unit that extracts keyword corresponding to the acquired text information by referencing dictionary information indicating the keyword to be extracted and the keyword is associated with an input item;
an identification unit that identifies the input item by designating the name of the input item to the input item from among a plurality of input items into which the acquired text information is entered, the plurality of input items being included in business form information indicating a business form;
a creation unit that enters the extracted keyword into the identified input item and update the business form based on the extracted keyword entered into the input item included in the business form information; and
an message output unit that displays a first layer displaying the business form view showing the updated business form, and a second layer overlaid on the first layer, the second layer displaying the chat view with a preset transmittance in a state where the business form view is visible by displaying (i) the text information entered by a user of the terminal and (ii) a predetermined message output from the terminal in a conversational form on the terminal at a position of the updated business form by moving the predetermined message to a position that does not overlap with an area of the input item in which the keywords has been entered on the basis of the position information indicating the position of the input item in which the keyword has been entered on the update business form view.

16. An information input system comprising:
a terminal; and
a server group, wherein
the terminal transmits text information to the server group, and acquires, from the server group, a piece of information relevant to a plurality of input items to which the piece of information is input, and
the server group has a text information acquisition unit that acquires the text information from the terminal on a chat view, an extraction unit that extracts keyword corresponding to the acquired text information by referencing dictionary information indicating the keyword to be extracted and the keyword is associated with an input item, an identification unit that identifies the input item by designating the name of the input item from among the plurality of input items into which the acquired text information is entered, the plurality of input items being included in business form information indicating a business form, a creation unit that enters the extracted keyword into the identified input item and update the business form based on the extracted keyword entered into the input item included in the business form information, and a message output unit that outputs to the terminal to display a first layer displaying the business form view showing the updated business form, and a second layer overlaid on the first layer, the second layer displaying the chat view with a preset transmittance in a state where the business form view is visible by displaying (i) the text information entered by a user of the terminal and (ii) a predetermined message output from the terminal in a conversational form on the terminal at a position of the updated business form by moving the predetermined message to a position that does not overlap with an area of the input item in which the keyword has been entered on the basis of the position information indicating the position of the input item in which the keyword has been entered on the updated business form view.

* * * * *